United States Patent
Groh et al.

(10) Patent No.: US 7,136,456 B2
(45) Date of Patent: Nov. 14, 2006

(54) DEPTH DIAPHRAGM FOR AN X-RAY DEVICE

(75) Inventors: Burkhard Groh, Chicago, IL (US); Volker Heer, Gundelsheim (DE); Mathias Hörnig, Erlangen (DE); Bernhard Sandkamp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/042,860

(22) Filed: Jan. 25, 2005

(65) Prior Publication Data

US 2005/0169431 A1   Aug. 4, 2005

(30) Foreign Application Priority Data

Jan. 29, 2004   (DE)   ............. 10 2004 004 629

(51) Int. Cl.
*G21K 1/04*   (2006.01)

(52) U.S. Cl. ................................. 378/152; 378/148
(58) Field of Classification Search ........... 378/14–153
See application file for complete search history.

(56) References Cited

U.S. PATENT DOCUMENTS

| 3,668,402 A | * | 6/1972 | Palermo et al. | ............ 378/150 |
| 5,365,566 A | | 11/1994 | Maas | |
| 6,788,764 B1 | * | 9/2004 | Saladin et al. | ............ 378/152 |

FOREIGN PATENT DOCUMENTS

| DE | 1 081 187 | 5/1960 |
| DE | 29 982 | 8/1964 |

* cited by examiner

*Primary Examiner*—Edward J. Glick
*Assistant Examiner*—Hoon Song

(57) ABSTRACT

Depth diaphragm for an x-ray device, which diaphragm has a plurality of adjustable diaphragm blades (1) for displaying an area being examined, which blades (1) can be moved in such a way that said area being examined can be displayed asymmetrically.

5 Claims, 2 Drawing Sheets

DEPTH DIAPHRAGM FOR AN X-RAY DEVICE

CROSS REFERENCE TO RELATED APPLICATIONS

This application claims priority to the German application No. 10 2004 004 629.8, filed Jan. 29, 2004 which is incorporated by reference herein in its entirety.

FIELD OF INVENTION

The invention relates to a depth diaphragm for an x-ray device, which diaphragm has a plurality of adjustable diaphragm blades for displaying an area being examined, which blades can be moved in such a way that said area being examined can be displayed asymmetrically.

BACKGROUND OF INVENTION

Depth diaphragms are components of x-ray equipment and serve to variably restrict the bundle of rays to the necessary field size. The undesired portions of the rays are absorbed by the diaphragm blades, which are usually made of lead. To set the depth diaphragm, the desired field size can be simulated by means of a light bundle. X-ray equipment is usually fitted with depth diaphragms having two pairs of lead blades for adjusting the height and width of the image display. Said pairs of lead blades are controlled symmetrically with respect to the center of the detector and isocentrically with respect to the x-ray tube. The plate-shaped diaphragm blades cannot, however, be enlarged at will as that would also increase the size of the depth diaphragm, resulting in, for instance, angulation limiting on a C-arch of the x-ray device.

SUMMARY OF INVENTION

It is therefore an object of the invention to provide a depth diaphragm offering expanded setting options and enabling the area being examined to be displayed flexibly.

This object is achieved by the claims.

The depth diaphragm according to the invention offers expanded setting options that eliminate the customary restriction to symmetrical settings. Each diaphragm blade can in particular be controlled independently. Each such blade of the depth diaphragm according to the invention can for this purpose be assigned a drive, preferably an electric motor.

The depth diaphragm according to the invention allows the area being examined to be displayed far more flexibly compared to conventional devices. The depth diaphragm and the x-ray device overall are far easier to set and operate because far more setting options are available. This flexibility is particularly advantageous when there is cause for a patient not to be examined in a standard position.

Being attached to each other in an articulated fashion, the individual blade sections can be accommodated in a space saving manner in a depth diaphragm housing.

A further improvement in the depth diaphragm according to the invention can be achieved by providing the possibility of winding a diaphragm blade on a drum that can be controlled by the drive, in particular by the electric motor. In this embodiment of the invention each diaphragm blade can be wound on a drum. To set the area being examined, the relevant drum drive is activated so that the respective diaphragm blade wound on the drum is moved into said area being examined. If a total of four diaphragm blades are provided arranged at right angles to each other, opposite drums can be arranged in a plane so that the drums will not obstruct each other.

The diaphragm blades can according to the invention be flexible. Each diaphragm blade can advantageously be moved separately.

According to a second, alternative embodiment of the invention the depth diaphragm can have two pairs of diaphragm blades that can be individually moved in the same direction and are arranged in one plane above the other. The essential feature here is that each diaphragm blade can be separately controlled and moved so that the diaphragm blades can be positioned asymmetrically. It is thus of practical advantage for each diaphragm blade to be connected to its own drive, for example to an electric motor. The are a being examined can in this way be displayed asymmetrically even with plate shaped diaphragm blades.

The diaphragm blades can preferably be made of lead, but it is also possible to embed them in a plastic material or coat them with a plastic material.

It is of particular practical advantage if the depth diaphragm according to the invention can be or is coupled to an operating device by means of which each diaphragm blade can be actuated separately. It can also be provided for the operating device to have an input device such as a joystick or mouse.

The invention further relates to an x-ray device characterized in having a depth diaphragm of the type described.

BRIEF DESCRIPTION OF THE DRAWINGS

Further advantages and specifics of the invention will be explained with the aid of exemplary embodiments and with reference to the drawings. The drawings are schematic representations showing the following.

DETAILED DESCRIPTION OF INVENTION

Figure 1:
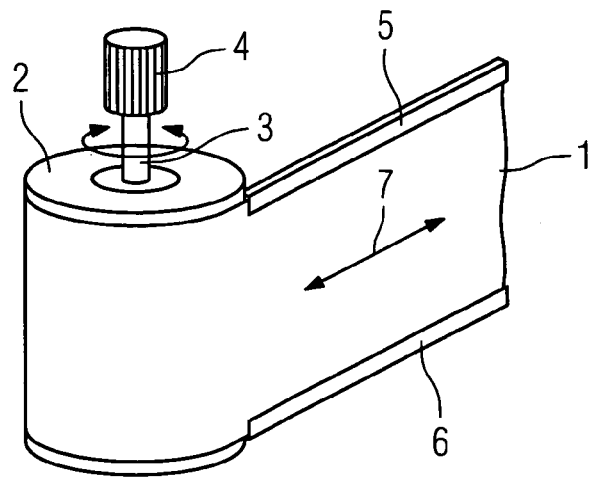
FIG. 1 is a first exemplary embodiment of the invention having a diaphragm blade of a depth diaphragm according to the invention which blade is wound on a drum.

FIG. 1 shows a diaphragm blade 1 made of lead or a lead alloy and wound onto a drum 2. The drum 2 is connected via a shaft 3 to a schematically represented motor 4 for rotating the drum 2 in both directions.

The diaphragm blade 1 is laterally ducted in guide rails 5, 6 so that the diaphragm blade 1 is wound from the drum 2 or onto the drum 2 parallel to the guide rails 5, 6 when the motor 4 has been activated. The directions of motion of the diaphragm blade 1 are indicated in FIG. 1 by the double arrow 7.

The diaphragm blade 1 is sufficiently flexible to be able to be wound onto the drum 2. On the other hand the lead coating is sufficiently thick to shield off and absorb the undesired radiation. To facilitate winding onto the drum 2, the diaphragm blade 1 is embodied in the manner of a roller shutter.

Figure 2:
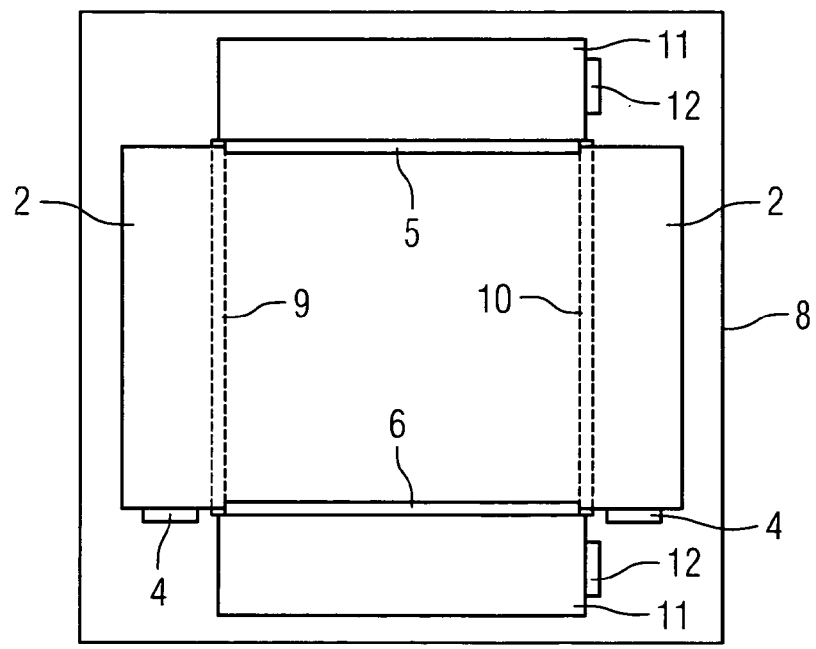
FIG. 2 is a top view of a depth diaphragm according to the invention containing four drums.

FIG. 2 is a top view of a depth diaphragm 8 containing four drums 2, 11. The drums correspond to the drum 2 shown in FIG. 1, with in each case two drums 2 or, as the case may be, 11 being located opposite each other in pairs. Each of the drums 2, 11 is provided with a drive that is shown schematically and embodied as an electric motor 4, 12. Also shown in FIG. 2 are the two pairs of guide rails 5, 6 and 9, 10. Flexible diaphragm blades not shown in the figure are wound onto the drums 2, 11.

Figure 3:
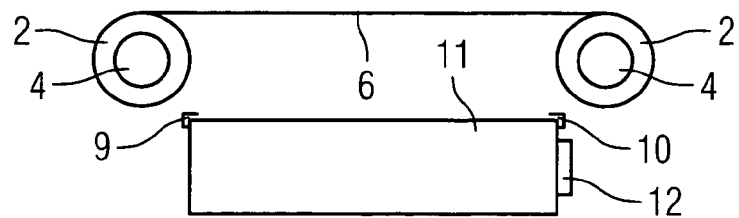
FIG. 3 is a lateral view of the depth diaphragm shown in FIG. 2.

FIG. 3 is a lateral view of the depth diaphragm 8 shown in FIG. 2. As can be seen in FIG. 3, the pairs of drums 2 and 11 are in each case located opposite each other in pairs, with the two pairs of drums 2, 11 being arranged in different, parallel planes. The two electric motors 4 of the top pair of drums 2 can be controlled separately from each other so that the diaphragm blade wound on the left-hand drum 2 is moved to the right or left when the left-hand motor 4 in FIGS. 2 and 3 has been activated. When the electric motor 4 on the right in FIGS. 2 and 3 has been activated, the diaphragm blade wound on the right-hand drum 2 is analogously moved to the left or right to control the width of the image display. To move the drums 11, each drum 11 has been assigned an electric motor 12.

The bottom pair of drums 11 has been turned through 90° relative to the top pair of drums 2 but is otherwise controlled in the same manner. The respective drum 11 is made to rotate on activation of one of the electric motors 12 so that the diaphragm blade wound on the respective drum is moved in the vertical direction in FIG. 2 so that the height of the image display is controlled, with the diaphragm blades being ducted in the guide rails 9, 10.

Figure 4A:
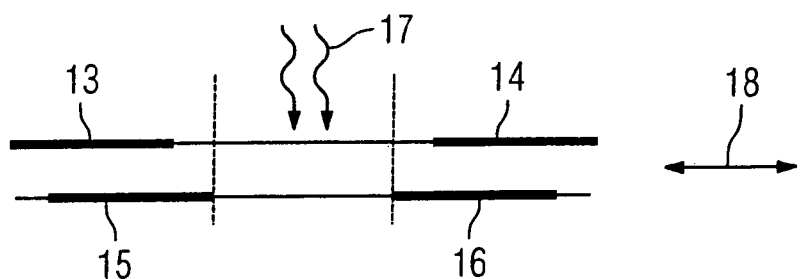
FIG. 4a is a second exemplary embodiment of the invention having two pairs of diaphragm blades arranged in one plane above the other.

FIG. 4*a* shows a second exemplary embodiment of the invention having two pairs of diaphragm blades arranged in one plane above the other.

The top pair consists of the diaphragm blades 13, 14 embodied as plate-shaped lead blades. Each of the diaphragm blades 13, 14 can be separately positioned via a drive (not shown). Arranged in a second plane below the diaphragm blades 13, 14 are diaphragm blades 15, 16 having the same physical structure as the diaphragm blades 13, 14. The diaphragm blades 15, 16 can also each be positioned separately in the direction indicated by the double arrow 18. This means that the e-ray beam 17 can only impinge on areas not obscured either by the top pair of diaphragm blades 13, 14 or by the bottom pair 15, 16. The setting options are multifarious as the diaphragm blades can be separately positioned.

Figure 5:
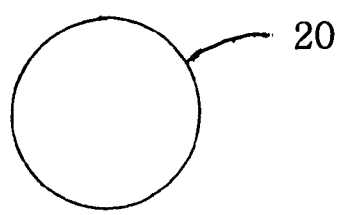
FIG. 5 is a top view of a disc-shaped diaphragm blade.

FIG. 5 illustrates a top view of a diaphragm blade 20 that is shaped as a disk, as may be used in one embodiment of the present invention.

Figure 4B:
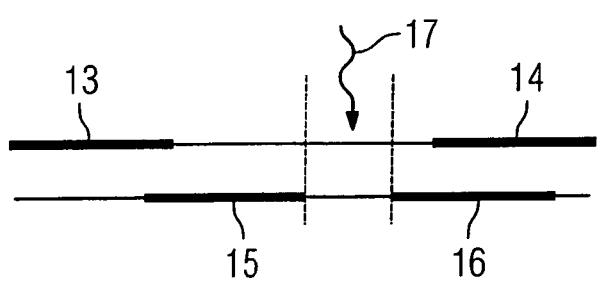
FIG. 4b illustrates the diaphragm blades shown in FIG. 4a in a second position.

FIG. 4*b* illustrates the diaphragm blades shown in FIG. 4*a* in a second position. While the top pair of diaphragm blades 13, 14 has remain unchanged compared to FIG. 4*a*, the diaphragm blade 15 belonging to the bottom pair of blades has been moved toward the second diaphragm blade 16 so that the area permeable to the x-ray beam 17 has been reduced in size.

Figure 4C:
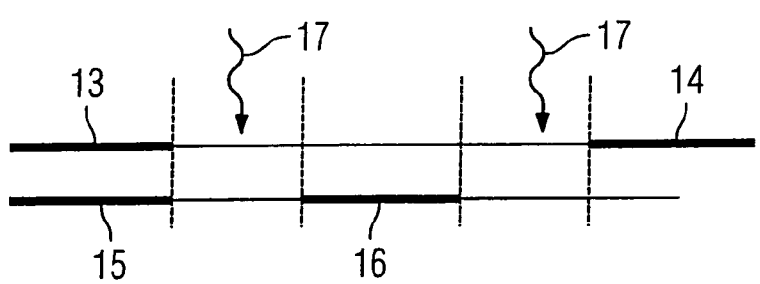
FIG. 4c illustrates the diaphragm blades shown in FIG. 4a in a third position.

FIG. 4*c* illustrates the diaphragm blades shown in FIG. 4*a* in a third position. The top two diaphragm blades 13, 14 have each been moved outward, resulting in a large space through which the x-ray beam 17 enters. The diaphragm blade 15 belonging to the bottom pair of diaphragm blades has been moved aside like the diaphragm blade 13 so as to be situated exactly below the diaphragm blade 13. The second diaphragm blade 16 belonging to the bottom pair of diaphragm blades is located in the space formed by the top diaphragm blades 13, 14. The x-ray beam 17 can therefore only impinge on the object being examined through the two areas left and right of the diaphragm blade 16.

The positioning of the diaphragm blades shown in FIG. 4*c* would be an advantageous choice for examining a patient's legs, for example. The area in the center of the image will be masked out by moving the diaphragm blade 16 into the space between the diaphragm blades 13 and 14.

A factor common to all embodiments is that they can be used in conjunction with large-area detectors without increasing the size of the depth diaphragm.

The invention claimed is:

1. A depth diaphragm for an x-ray device, comprising a plurality of adjustable diaphragm blades for fading in an examination area, wherein the diaphragm blades are shaped as disks and include at least two pairs of diaphragm blades individually moveable in a common direction, the pairs arranged in two layers, the layers arranged one upon the other, so that the examination area is faded in asymmetrically.

2. The depth diaphragm according to claim 1, wherein each diaphragm blade is individually moveable by a drive.

3. The depth diaphragm according to claim 1, wherein the diaphragm blades are made of lead and are embedded in or coated with a plastic material.

4. The depth diaphragm according to claim 1, wherein the depth diaphragm is operatively connected to a diaphragm operating device, the diaphragm operating device arranged and constructed such tat each diaphragm blade is actuated individually.

5. An X-ray device, comprising a depth diaphragm, the depth diaphragm comprising a plurality of adjustable diaphragm blades for fading in an examination area, wherein the diaphragm blades are shaped as disks and include at least two pairs of diaphragm blades individually moveable in a common direction, the pairs arranged in two layers, the layers arranged one upon the other, so that the examination area is faded in asymmetrically.

* * * * *